US010248555B2

United States Patent
Giri et al.

(10) Patent No.: US 10,248,555 B2
(45) Date of Patent: *Apr. 2, 2019

(54) MANAGING AN EFFECTIVE ADDRESS TABLE IN A MULTI-SLICE PROCESSOR

(71) Applicant: International Business Machines Corporation, Armonk, NY (US)

(72) Inventors: Akash V. Giri, Austin, TX (US); David S. Levitan, Austin, TX (US); Mehul Patel, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,434

(22) Filed: May 31, 2016

(65) Prior Publication Data
US 2017/0344469 A1 Nov. 30, 2017

(51) Int. Cl.
| G06F 9/32 | (2018.01) |
| G06F 9/34 | (2018.01) |
| G06F 9/35 | (2018.01) |
| G06F 12/02 | (2006.01) |

(Continued)

(52) U.S. Cl.
CPC .......... G06F 12/0215 (2013.01); G06F 9/321 (2013.01); G06F 9/34 (2013.01); G06F 9/35 (2013.01); G06F 12/1009 (2013.01); G06F 13/36 (2013.01); *G06F 2212/654* (2013.01)

(58) Field of Classification Search
CPC .... G06F 12/0215; G06F 12/1009; G06F 9/32; G06F 9/321; G06F 9/322; G06F 9/34; G06F 9/35; G06F 9/355; G06F 9/3552; G06F 9/3555; G06F 9/3557; G06F 9/384;
(Continued)

(56) References Cited

U.S. PATENT DOCUMENTS

| 4,985,825 A | 1/1991 | Webb, Jr. et al. |
| 5,832,288 A | 11/1998 | Wong |
| 6,202,130 B1 | 3/2001 | Scales, III et al. |

(Continued)

FOREIGN PATENT DOCUMENTS

WO WO-9802805 A1 1/1998

OTHER PUBLICATIONS

Sinharoy, et al., "IBM POWER8 Processor Core Microarchitecture", IBM Journal of Research and Development, vol. 59, No. 1, Paper 2, Digital Object Identifier: 10.1147/JRD.2014.2376112, dated Jan./Feb. 2015, 21 pages.

(Continued)

*Primary Examiner* — Mano Padmanabhan
*Assistant Examiner* — William E. Baughman
(74) *Attorney, Agent, or Firm* — Nathan M. Rau

(57) ABSTRACT

Methods and apparatus for managing an effective address table (EAT) in a multi-slice processor including receiving, from an instruction sequence unit, a next-to-complete instruction tag (ITAG); obtaining, from the EAT, a first ITAG from a tail-plus-one EAT row, wherein the EAT comprises a tail EAT row that precedes the tail-plus-one EAT row; determining, based on a comparison of the next-to-complete ITAG and the first ITAG, that the tail EAT row has completed; and retiring the tail EAT row based on the determination.

13 Claims, 7 Drawing Sheets

(51) Int. Cl.
*G06F 13/36* (2006.01)
*G06F 12/1009* (2016.01)

(58) Field of Classification Search
CPC .... G06F 9/3838; G06F 9/3855; G06F 9/3857; G06F 2212/654
USPC ......... 711/203–209; 712/216–219, 233, 245, 712/239
See application file for complete search history.

(56) References Cited

U.S. PATENT DOCUMENTS

| | | | |
|---|---|---|---|
| 6,212,629 | B1 | 4/2001 | McFarland et al. |
| 6,266,744 | B1* | 7/2001 | Hughes ................. G06F 9/3834 711/123 |
| 6,393,544 | B1 | 5/2002 | Bryg et al. |
| 6,553,480 | B1 | 4/2003 | Cheong et al. |
| 6,584,557 | B1 | 6/2003 | Taylor |
| 7,600,099 | B2 | 10/2009 | Le et al. |
| 7,689,812 | B2 | 3/2010 | Abernathy et al. |
| 7,711,929 | B2 | 5/2010 | Burky et al. |
| 8,131,976 | B2 | 3/2012 | Doing et al. |
| 8,386,753 | B2 | 2/2013 | Eisen et al. |
| 8,516,230 | B2 | 8/2013 | Chen et al. |
| 8,892,841 | B2 | 11/2014 | Gunna et al. |
| 8,943,299 | B2 | 1/2015 | Ekanadham et al. |
| 8,966,232 | B2 | 2/2015 | Tran |
| 9,361,114 | B1 | 6/2016 | Tene et al. |
| 9,513,926 | B2 | 12/2016 | Snyder, II et al. |
| 2005/0228972 | A1* | 10/2005 | Eisen .................... G06F 9/3836 712/218 |
| 2008/0082794 | A1 | 4/2008 | Yu et al. |
| 2009/0063823 | A1* | 3/2009 | Burky .................. G06F 9/3838 712/216 |
| 2010/0262813 | A1 | 10/2010 | Brown et al. |
| 2010/0262967 | A1* | 10/2010 | Eisen ..................... G06F 9/485 718/102 |
| 2014/0129806 | A1 | 5/2014 | Kaplan |
| 2015/0046690 | A1 | 2/2015 | Eickemeyer et al. |
| 2015/0120985 | A1 | 4/2015 | Frey et al. |
| 2017/0329607 | A1 | 11/2017 | Eickemeyer et al. |
| 2017/0329715 | A1 | 11/2017 | Eickemeyer et al. |
| 2017/0344368 | A1 | 11/2017 | Levitan et al. |
| 2017/0344378 | A1 | 11/2017 | Giri et al. |
| 2017/0344379 | A1 | 11/2017 | Levitan et al. |

OTHER PUBLICATIONS

Anonymous, "Thermometer Mask Generation Using log2(N)-1 bits", An IP.com Prior Art Database Technical Disclosure (online), IP.com No. 000228833, URL: http://ip.com/IPCOM/000228833, dated Jul. 9, 2013, 6 pages.

Anonymous, "Method and Apparatus for Early Fetch Redirection in a Computer Processor", An IP.com Prior Art Database Technical Disclosure (online), IP.com No. 000223643, URL: http://ip.com/IPCOM/000223643, dated Nov. 20, 2012, 6 pages.

Anonymous, "Quadrant based Instruction ID assignment for SMT (Simultaneous Multithreading) microprocessor", An IP.com Prior Art Database Technical Disclosure (online), IP.com No. 000239611, URL: http://ip.com/IPCOM/000239611, dated Nov. 19, 2014, 4 pages.

Motorola et al., "A Novel High-Effective Land Control Method in 3G Systems", An IP.com Prior Art Database Technical Disclosure (online), IP.com No. 000136665, URL: http://ip.com/IPCOM/000136665, dated May 26, 2006, 5 pages.

Gandhi et al., "Scalable Load and Store Processing in Latency Tolerant Processors", Proceedings of the $32^{nd}$ International Symposium on Computer Architecture (ISCA'05), Jun. 2005, 12 pages, IEEE Computer Society, Piscataway, NJ.

Appendix P; List of IBM Patents of Application Treated as Related, Aug. 17, 2016, 2 pages.

U.S. Appl. No. 15/162,998, to David S. Levitan et al., entitled, *Generating a Mask Vector for Determining a Processor Instruction Address Using an Instruction Tag in a Multi-Slice Processor*, assigned to International Business Machines Corporation, filed May 24, 2016, 40 pages.

U.S. Appl. No. 15/168,560, to David S. Levitan et al., entitled, *Identifying an Effective Address (EA) Using an Interrupt Instruction Tag (ITAG) in a Multi-Slice Processor*, assigned to International Business Machines Corporation, filed May 31, 2016, 40 pages.

U.S. Appl. No. 15/155,327, to Richard J. Eickemeyer et al., entitled *Hazard Avoidance in a Multi-Slice Processor*, assigned to International Business Machines Corporation, filed May 16, 2016, 35 pages.

U.S. Appl. No. 15/220,028, to Richard J. Eickemeyer et al., entitled *Hazard Avoidance in a Multi-Slice Processor*, assigned to International Business Machines Corporation, filed Jul. 26, 2016, 35 pages.

U.S. Appl. No. 15/220,798, to Akash V. Giri et al., entitled, *Managing An Effective Address Table in a Multi-Slice Processor*, assigned to International Business Machines Corporation, filed Jul. 27, 2016, 32 pages.

\* cited by examiner

MANAGING AN EFFECTIVE ADDRESS TABLE IN A MULTI-SLICE PROCESSOR

BACKGROUND

Field of the Invention

The field of the invention is data processing, or, more specifically, methods, apparatus, and products for managing an effective address table (EAT) in a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for managing an effective address table (EAT) in a multi-slice processor. Managing an EAT includes receiving, from an instruction sequence unit, a next-to-complete instruction tag (ITAG); obtaining, from the EAT, a first ITAG from a tail-plus-one EAT row, wherein the EAT comprises a tail EAT row that precedes the tail-plus-one EAT row; determining, based on a comparison of the next-to-complete ITAG and the first ITAG, that the tail EAT row has completed; and retiring the tail EAT row based on the determination.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
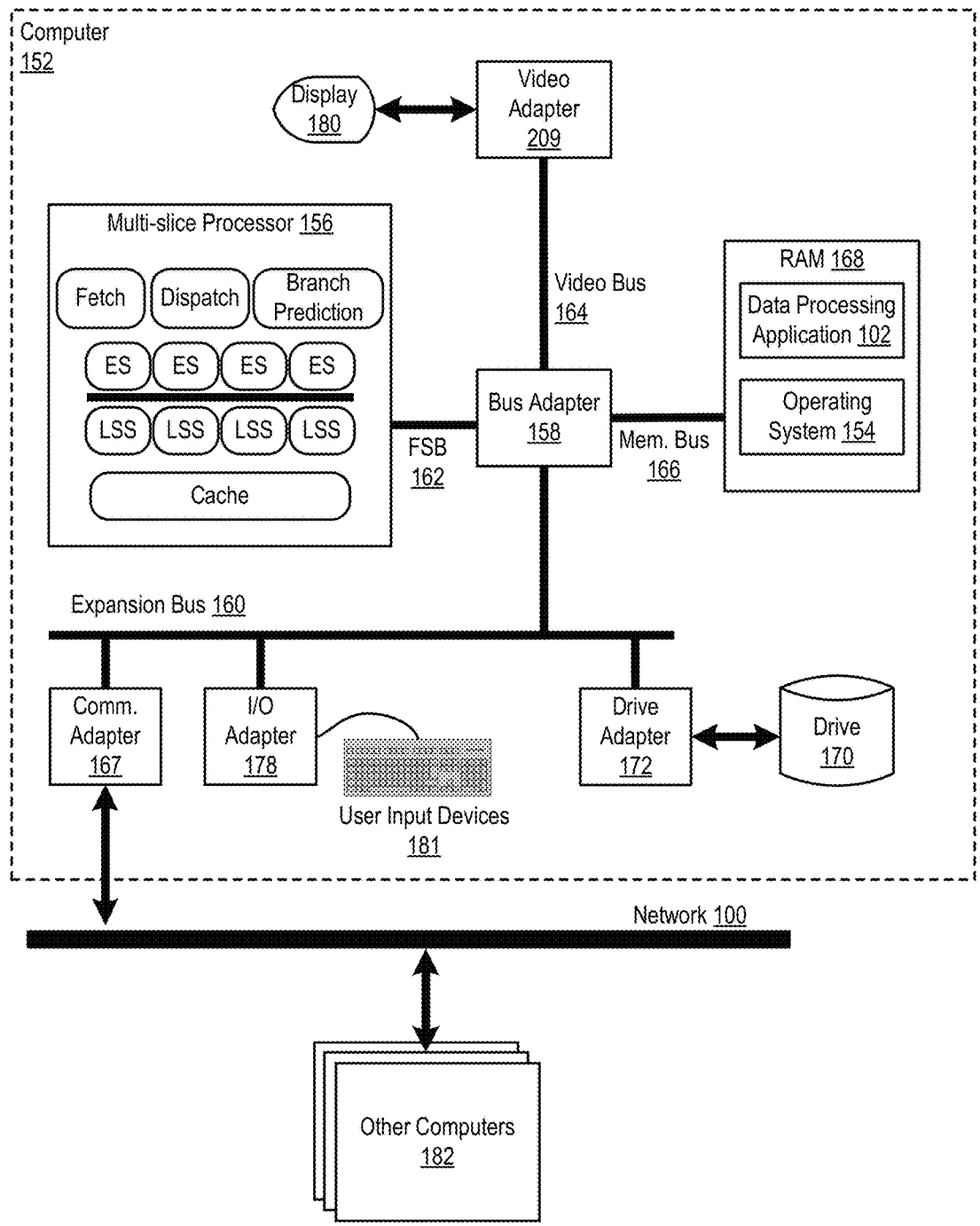
FIG. 1 sets forth an example system configured managing an effective address table (EAT).

Exemplary methods, apparatus, and products for managing an effective address table (EAT) in accordance with the present invention are described with reference to the accompanying drawings, beginning with FIG. 1. FIG. 1 sets forth a network diagram of a system configured for managing an EAT according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
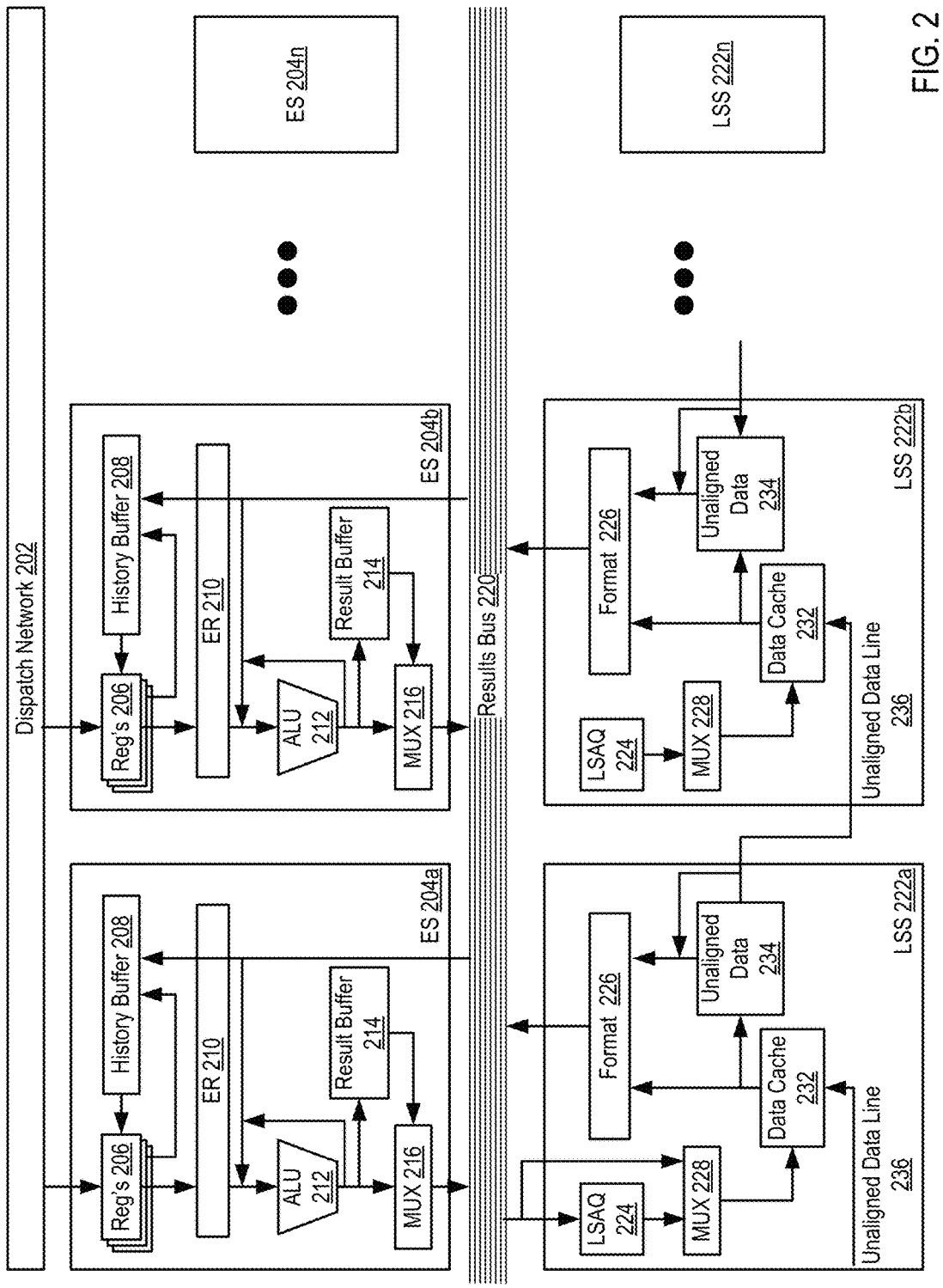
FIG. 2 sets forth an example system configured for managing an EAT.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (GPR) (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
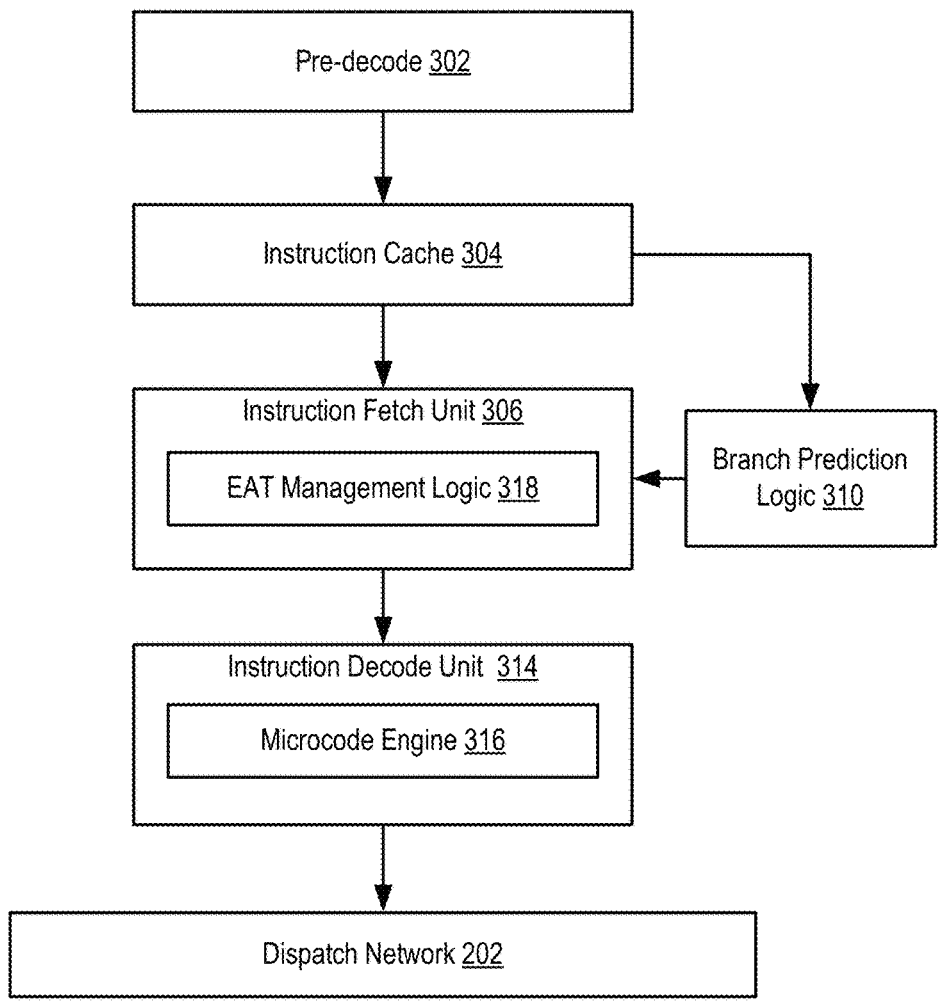
FIG. 3 sets forth an example system configured managing an EAT.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308). The instruction fetch unit (306) includes effective address table (EAT) management logic (318). The EAT management logic (318) is logic within the instruction fetch unit (306) that manages the EAT, including retiring EAT rows based on received next-to-complete instruction tags (ITAGs).

The example instruction decode unit (314) of FIG. 3 performs a final decode operation on the fetched instructions and provides the decoded instructions to the dispatch network (202). The example instruction decode unit (314) of FIG. 3 also includes a microcode engine (316). The microcode engine generally performs a portion of decoding an instruction in which machine code is translated into hardware-level instructions. Additionally, as described below in greater detail, the example microcode engine of FIG. 3 may also assist in the performance of thread migration in the multi-slice processor. The dispatch network as described above, dispatches the decoded instructions among slices.

Figure 4:
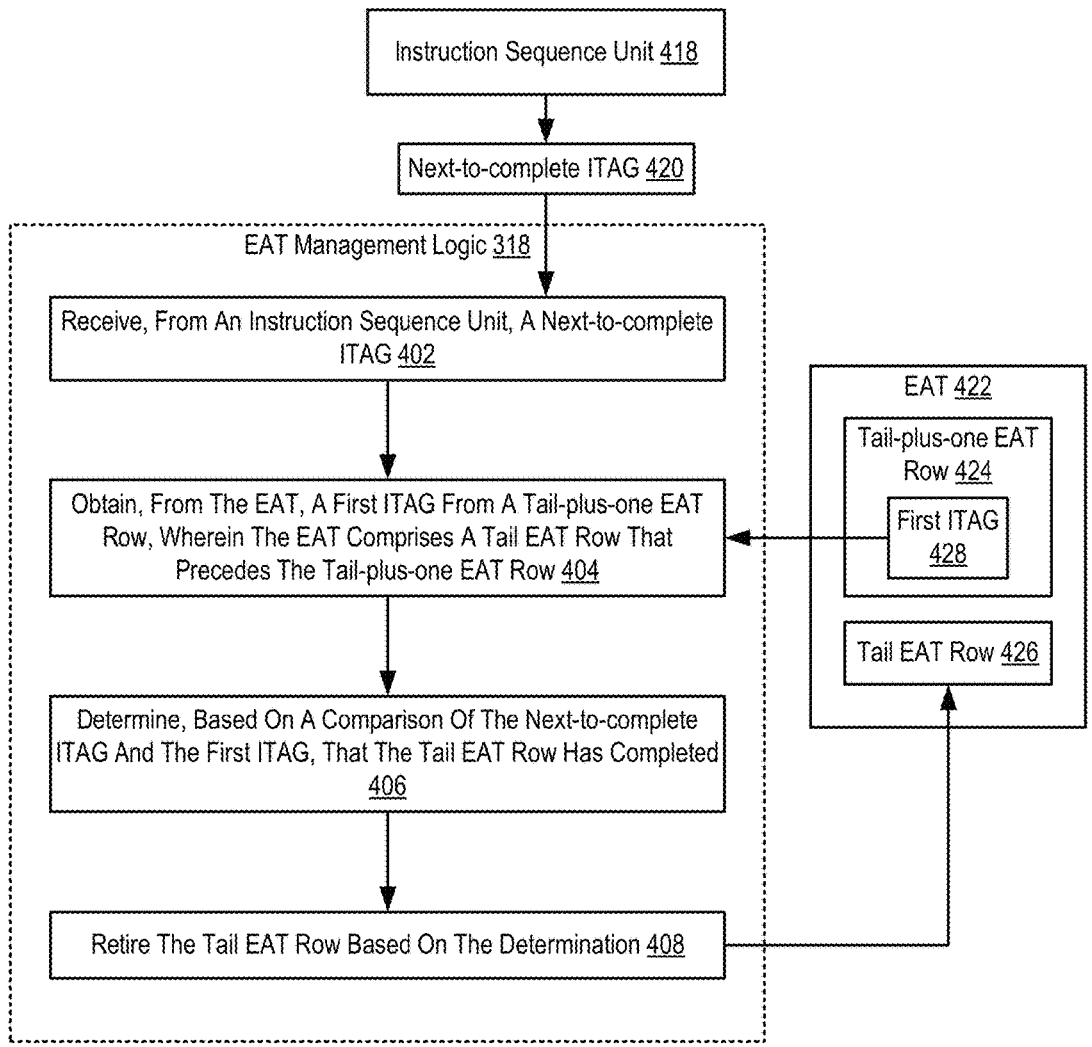
FIG. 4 sets forth a flow chart illustrating an exemplary method for managing an EAT.

For further explanation, FIG. 4 sets forth a flow chart illustrating an exemplary method for managing an effective address table (EAT). FIG. 4 includes receiving (402), from an instruction sequence unit (418), a next-to-complete instruction tag (ITAG) (420). Receiving (402), from an instruction sequence unit (418), a next-to-complete ITAG (420) may be carried out by receiving an interface from the instruction sequence unit (418) that includes a value for a next-to-complete ITAG.

An ITAG is an instruction identifier. Each ITAG tracks an internal instruction from decode to completion. Each internal instruction may be assigned an ITAG by an ITAG assignment unit, which assigns ITAGs sequentially to internal instructions before the internal instructions are transmitted to a dispatch unit.

Internal operations are the result of decoding processor instructions, and each internal operation is tracked using an ITAG. Processor instructions may be decoded into a single internal operation or may be decoded into a plurality of internal operations. Processor instructions, from which the internal operations are generated, are stored using effective addresses. The effective address of a processor instruction may not be tracked outside of the instruction fetch unit (306). Elements outside of the instruction fetch unit (306) may reference a processor instruction using an ITAG assigned to one of the internal operations generated from the processor instruction.

A next-to-complete ITAG (420) is the ITAG of the next internal operation to be completed. Receiving the next-to-complete ITAG (420) indicates that all ITAGs less than the next-to-complete ITAG have completed. The instruction sequence unit (418) sends a next-to-complete ITAG (420) periodically to inform the instruction fetch unit (306) that each internal operation assigned ITAGs less than the next-to-complete ITAG (420) have completed.

FIG. 4 also includes obtaining (404), from the EAT (422), a first ITAG (428) from a tail-plus-one EAT row (424), wherein the EAT comprises a tail EAT row (426) that precedes the tail-plus-one EAT row (424). Obtaining (404), from the EAT (422), a first ITAG (428) from a tail-plus-one EAT row (424), wherein the EAT comprises a tail EAT row (426) that precedes the tail-plus-one EAT row (424) may be carried out by accessing the EAT (422). The effective address table (EAT) is made up of rows, such as the tail EAT row (426) and the tail-plus-one EAT row (424). Each row in the EAT may include a starting effective address, an ending effective address, and a first ITAG. The first ITAG is the first in a range of ITAGs assigned to the internal operations generated from the processor instructions stored in the effective addresses. Each EAT row may not include ITAGs other than the first ITAG. The last ITAG in the range of ITAGs associated with an EAT row is the ITAG just previous to the first ITAG of the next EAT row.

For example, the tail EAT row (426) may include a first ITAG of '14', the tail-plus-one EAT row (424) may include a first ITAG of '25', and a tail-plus-two EAT row may include a first ITAG of '64'. Therefore, the tail EAT row (426) includes the ITAG range of '14' through '24', the tail-plus-one EAT row (426) includes the ITAG range of '25' through '63', and the tail-plus-two EAT row (426) includes an ITAG range starting with the ITAG '64'.

Obtaining (404), from the EAT (422), a first ITAG (428) from a tail-plus-one EAT row (424), wherein the EAT comprises a tail EAT row (426) that precedes the tail-plus-one EAT row (424) may further be carried out by selecting the tail-plus-one EAT row (424) and reading the value in the tail-plus-one EAT row for the first ITAG (428).

An EAT row may be designated the tail EAT row by storing an identifier for the EAT row in a tail pointer variable such that a tail pointer may be used to reference the tail EAT row. Similarly, a head pointer is used to reference a head EAT row. The EAT rows defined by the tail EAT row and head EAT row are the EAT rows that include the effective addresses of processor instructions currently in an active state of execution. The tail-plus-one EAT row is a row that follows the tail EAT row and is closer to the head EAT row than the tail EAT row is to the head EAT row. The tail-plus-one EAT row may be the next row following the tail EAT row.

FIG. 4 also includes determining (406), based on a comparison of the next-to-complete ITAG (420) and the first ITAG (428), that the tail EAT row (426) has completed. Determining (406), based on a comparison of the next-to-complete ITAG (420) and the first ITAG (428), that the tail EAT row (426) has completed may be carried out by comparing the next-to-complete ITAG (420) and the first ITAG (428) to determine a relationship between the numerical equivalents of the ITAG values. An ITAG may be implemented as a value with a numerical equivalent, such as set of binary bits. For example, an ITAG may be implemented as eight binary bits (e.g., '00001110').

Determining (406), based on a comparison of the next-to-complete ITAG (420) and the first ITAG (428), that the tail EAT row (426) has completed may be carried out by determining that the tail EAT row (426) has completed in response to the received next-to-complete ITAG (420) satisfying a particular relationship with the first ITAG (428). For example, the EAT management logic (318) may determine that the tail EAT row (426) has completed if the numerical equivalent of the next-to-complete ITAG (420) is greater than or equal to the numerical equivalent of the first ITAG (428) (i.e., the next-to-complete ITAG (420) is at least as great numerically as the first ITAG (428)).

FIG. 4 also includes retiring (408) the tail EAT row (426) based on the determination (406). Retiring (408) the tail EAT row (426) based on the determination (406) may be carried out by performing necessary tasks in order to gracefully dispose of the tail EAT row (426). Even though the internal operations corresponding to the processor instructions have completed, the EAT management logic (318) may be required to perform certain tasks before the tail EAT row (426) may be disposed (e.g., by advancing a tail pointer).

Further, the EAT management logic (318) may be limited in its ability to retire EAT rows. For example, the EAT management logic (318) may be unable to retire more than one row per cycle. The EAT management logic (318) may receive a next-to-complete ITAG (420) indicating that the ITAGs associated with multiple active EAT rows have completed, but due to this limitation, the EAT management logic (318) may only retire one EAT row or a subset of EAT rows.

Figure 5:
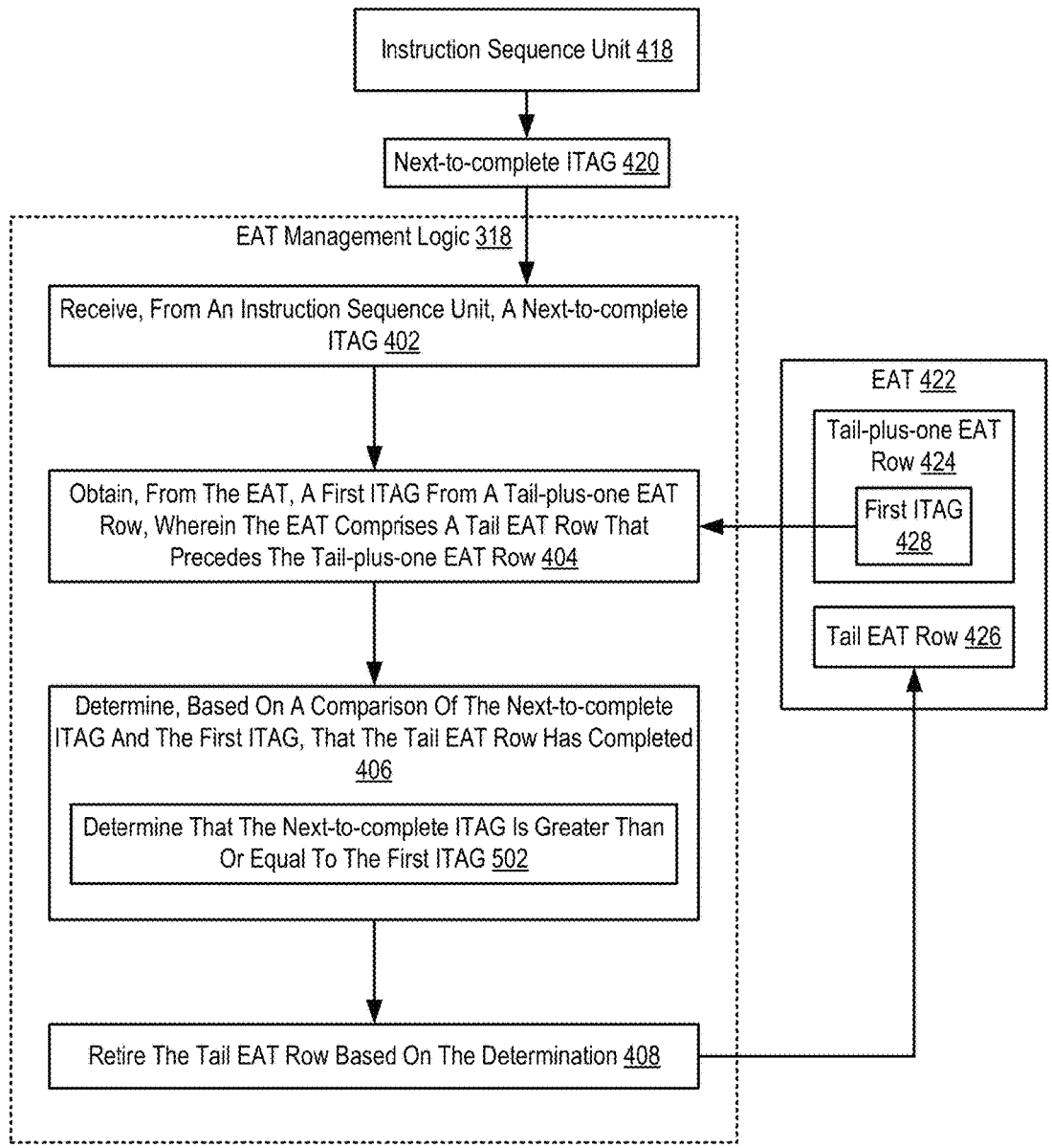
FIG. 5 sets forth a flow chart illustrating an exemplary method for managing an EAT.

For further explanation, FIG. 5 sets forth a flow chart illustrating a further exemplary method for managing an EAT according to embodiments of the present invention that includes receiving (402), from an instruction sequence unit (418), a next-to-complete ITAG (420); obtaining (404), from the EAT (422), a first ITAG (428) from a tail-plus-one EAT row (424), wherein the EAT comprises a tail EAT row (426) that precedes the tail-plus-one EAT row (424); determining (406), based on a comparison of the next-to-complete ITAG (420) and the first ITAG (428), that the tail EAT row (426) has completed; and retiring (408) the tail EAT row (426) based on the determination (406).

The method of FIG. 5 differs from the method of FIG. 4, however, in that determining (406), based on a comparison of the next-to-complete ITAG (420) and the first ITAG (428), that the tail EAT row (426) has completed includes determining (502) that the next-to-complete ITAG (420) is greater than or equal to the first ITAG (428). Determining that the next-to-complete ITAG (420) is greater than or equal to the first ITAG (428) indicates that each internal operation assigned an ITAG less than the first ITAG (428) of the tail-plus-one EAT row (424) has completed. Consequently, each active EAT row preceding the tail-plus-one EAT row (424) may be retired.

The received next-to-complete ITAG (420) may be greater than the range of ITAGs associated with the tail-plus-one EAT row (424). For example, the received next-to-complete ITAG (420) may be '100', the tail-plus-one EAT row (424) may have a first ITAG (428) of '14', and a tail-plus-two EAT row may have a first ITAG of '28'. Therefore, the range of ITAG associated with the tail-plus-one EAT row (424) is '14' through '27'. Even though the received next-to-complete ITAG (420) may be in a range of ITAGs associated with an EAT row that is many rows in front of the tail-plus-one EAT row (424), only one EAT row may be retired at a time, or during a single cycle.

Figure 6:
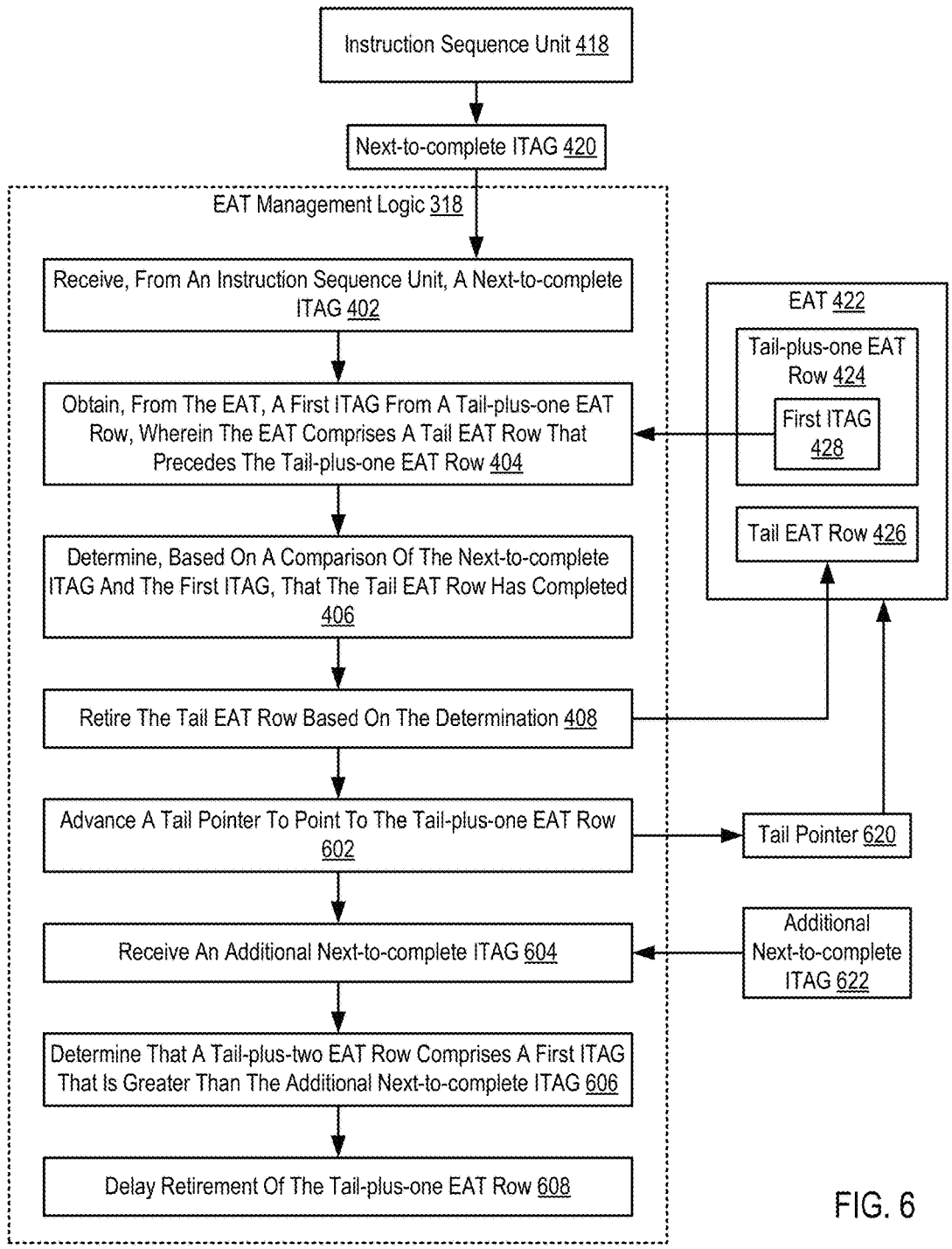
FIG. 6 sets forth a flow chart illustrating an exemplary method for managing an EAT.

For further explanation, FIG. 6 sets forth a flow chart illustrating a further exemplary method for managing an EAT according to embodiments of the present invention that includes receiving (402), from an instruction sequence unit (418), a next-to-complete ITAG (420); obtaining (404), from the EAT (422), a first ITAG (428) from a tail-plus-one EAT row (424), wherein the EAT comprises a tail EAT row (426) that precedes the tail-plus-one EAT row (424); determining (406), based on a comparison of the next-to-complete ITAG (420) and the first ITAG (428), that the tail EAT row (426) has completed; and retiring (408) the tail EAT row (426) based on the determination (406).

The method of FIG. 6 differs from the method of FIG. 4, however, in that FIG. 6 further includes advancing (602) a tail pointer (620) to point to the tail-plus-one EAT row (424). Advancing (602) a tail pointer (620) to point to the tail-plus-one EAT row (424) may be carried out by removing an association between the tail pointer (620) and the tail EAT row and establishing an association between the tail pointer (620) and tail-plus-one EAT row (424). For example, by storing, in a tail pointer variable, a new value identifying the tail-plus-one EAT row (424).

FIG. 6 also includes receiving (604) an additional next-to-complete ITAG (622). Receiving (604) an additional next-to-complete ITAG (622) be carried out by receiving an interface from the instruction sequence unit (418) that includes a new value for an additional next-to-complete ITAG (622) during a subsequent cycle. The additional next-to-complete ITAG (622) may indicate that all ITAGs less than the additional next-to-complete ITAG (622) have completed.

FIG. 6 also includes determining (606) that a tail-plus-two EAT row comprises a first ITAG that is greater than the additional next-to-complete ITAG (622). A tail-plus-two EAT row is a row in the EAT (422) that follows the tail-plus-one EAT row (424). The tail-plus-two EAT row may immediately follow the tail-plus-one EAT row (424).

Determining (606) that a tail-plus-two EAT row comprises a first ITAG that is greater than the additional next-to-complete ITAG (622) may be carried out by comparing the first ITAG of the tail-plus-two EAT row to the additional next-to-complete ITAG (622). For example, the next-to-complete ITAG (420) may be '14' and the additional next-to-complete ITAG (622) may be '25'. The tail-plus-one EAT row (424) may have a first ITAG (428) of '9', the tail-plus-two EAT row may have a first ITAG of '28', and a tail-plus-three EAT row may have a first ITAG of '127'. In this example, the tail-plus-two EAT row comprises a first ITAG ('28') that is greater than the additional next-to-complete ITAG (622) ('25'). In this example, the instruction sequence unit (418) has indicated that the ITAGs up-to-but-not-including '25' have completed. Therefore, there is no indication that the internal operations associated with ITAGs '26' or greater have completed. Therefore, the tail-plus-one EAT row (424), which includes the ITAG range '9' through '27', is not retired.

FIG. 6 also includes delaying (608) retirement of the tail-plus-one EAT row (424). Delaying (608) retirement of the tail-plus-one EAT row (424) be carried out by maintaining the current tail pointer (i.e., not advancing the tail pointer). Retirement of the tail-plus-one EAT row (424) may be delayed until a subsequent next-to-complete ITAG is received that is greater than or equal to the first ITAG of the tail-plus-two EAT row.

Figure 7:
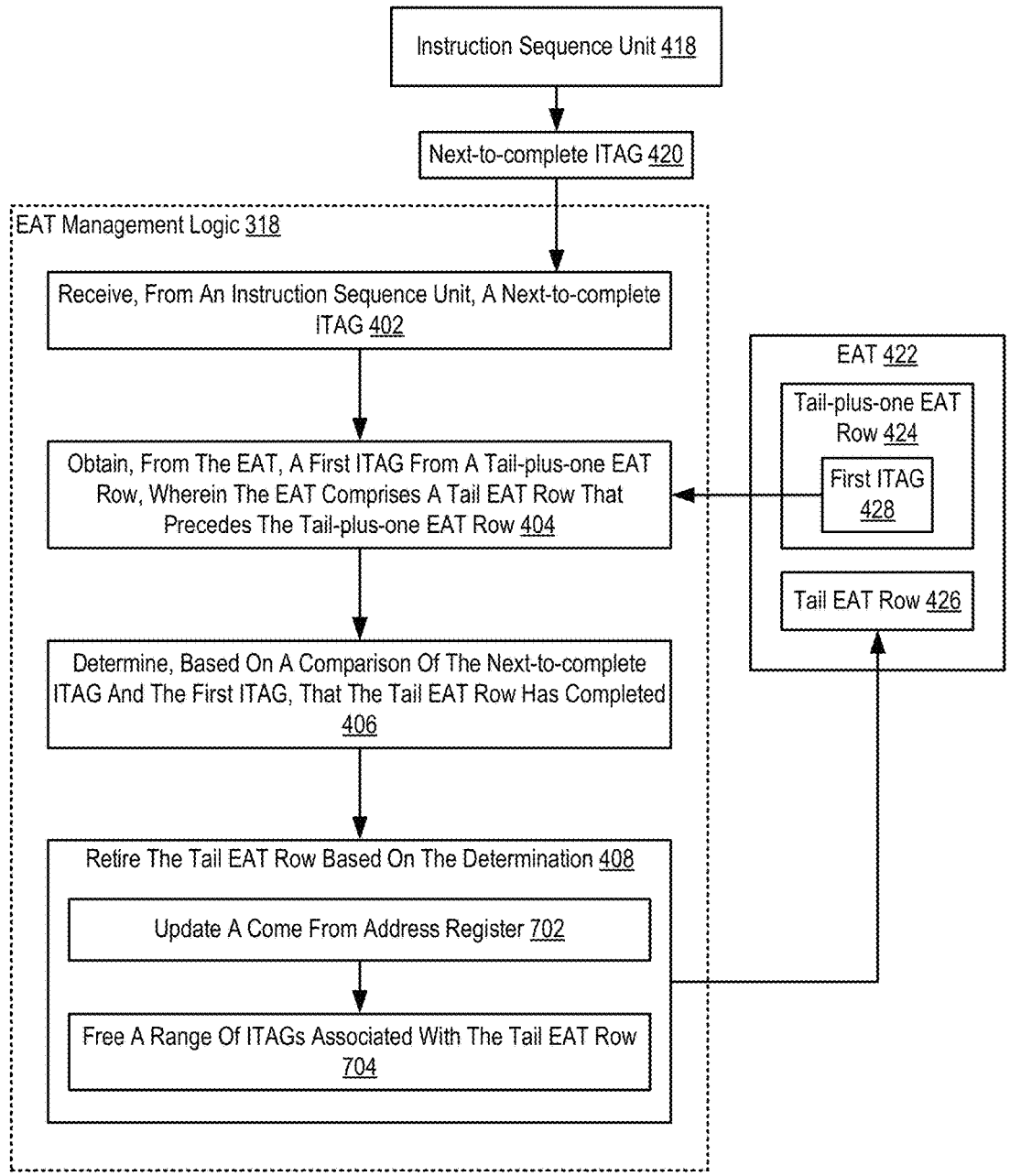
FIG. 7 sets forth a flow chart illustrating an exemplary method for managing an EAT.

For further explanation, FIG. 7 sets forth a flow chart illustrating a further exemplary method for managing an EAT according to embodiments of the present invention that includes receiving (402), from an instruction sequence unit (418), a next-to-complete ITAG (420); obtaining (404), from the EAT (422), a first ITAG (428) from a tail-plus-one EAT row (424), wherein the EAT comprises a tail EAT row (426) that precedes the tail-plus-one EAT row (424); determining (406), based on a comparison of the next-to-complete ITAG (420) and the first ITAG (428), that the tail EAT row (426) has completed; and retiring (408) the tail EAT row (426) based on the determination (406).

The method of FIG. 7 differs from the method of FIG. 4, however, in that retiring (408) the tail EAT row (426) based on the determination (406) includes updating (702) a come from address register; and freeing (704) a range of ITAGs associated with the tail EAT row (426). Updating (702) a come from address register may be carried out by storing the address of the most recently taken branch in the come from address register. The come from address register is updated upon completion of a branch instruction and must be completed before disposing of an EAT row. Additionally, other registers may be updated as part of the retiring process.

Freeing (704) a range of ITAGs associated with the tail EAT row (426) may be carried out by instructing an ITAG assignment unit that the range of ITAG associated with the tail EAT row (426) are available to assign to newly decoded internal operations. For example, the tail-plus-one EAT row (424) may have a first ITAG (428) of '9', the tail-plus-two EAT row may have a first ITAG of '28'. The ITAG assignment unit is notified that the range of ITAGs '9' through '27' may be assigned to new internal operations.

Exemplary embodiments of the present invention are described largely in the context of a fully functional computer system for managing an effective address table (EAT). Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multi-slice computer processor for managing an effective address table (EAT), the multi-slice computer processor configured for:
   receiving, by EAT management logic of an instruction fetch unit from an instruction sequence unit, a next-to-complete instruction tag (ITAG);
   obtaining, from the EAT, a first ITAG from a tail-plus-one EAT row, wherein the EAT comprises a tail EAT row that precedes the tail-plus-one EAT row, and wherein each EAT row comprises a starting effective address, an ending effective address, and a first ITAG in a range of ITAGs assigned to internal operations generated from processor instructions stored at a range of effective addresses defined by the starting effective address and the ending effective address;
   determining, based on a comparison of the next-to-complete ITAG and the first ITAG, that the tail EAT row has completed; and
   retiring the tail EAT row based on the determination, thereby retiring one or more effective addresses of the tail EAT row, wherein retiring the tail EAT row further comprises freeing a range of ITAGs associated with the tail EAT row for reassignment to newly decoded instructions.

2. The multi-slice computer processor of claim 1 wherein determining, based on a comparison of the next-to-complete ITAG and the first ITAG, that the tail EAT row has completed comprises:
   determining that the next-to-complete ITAG is greater than or equal to the first ITAG.

3. The multi-slice computer processor of claim 2 wherein the first ITAG is a first in a range of ITAGs associated with the tail-plus-one EAT row, and wherein the range of ITAGs associated with the tail-plus-one EAT row does not comprise the next-to-complete ITAG.

4. The multi-slice computer processor of claim 1 further configured for:
   advancing a tail pointer to point to the tail-plus-one EAT row.

5. The multi-slice computer processor of claim 4 further configured for:
   receiving an additional next-to-complete ITAG;
   determining that a tail-plus-two EAT row comprises a first ITAG that is greater than the additional next-to-complete ITAG; and
   delaying retirement of the tail-plus-one EAT row.

6. The multi-slice computer processor of claim 1 wherein retiring the tail EAT row comprises:
   updating a come from address register.

7. The multi-slice computer processor of claim 1 wherein receiving the next-to-complete ITAG indicates that all ITAGs less than the next-to-complete ITAG have completed.

8. A computing system, the computing system including a multi-slice computer processor for managing an effective address table (EAT), the multi-slice computer processor configured for:
   receiving, by EAT management logic of an instruction fetch unit from an instruction sequence unit, a next-to-complete instruction tag (ITAG);
   obtaining, from the EAT, a first ITAG from a tail-plus-one EAT row, wherein the EAT comprises a tail EAT row that precedes the tail-plus-one EAT row, and wherein each EAT row comprises a starting effective address, an ending effective address, and a first ITAG in a range of ITAGs assigned to internal operations generated from processor instructions stored at a range of effective addresses defined by the starting effective address and the ending effective address;

determining, based on a comparison of the next-to-complete ITAG and the first ITAG, that the tail EAT row has completed; and retiring the tail EAT row based on the determination, thereby retiring one or more effective addresses of the tail EAT row, wherein retiring the tail EAT row further comprises freeing a range of ITAGs associated with the tail EAT row for reassignment to newly decoded instructions.

9. The computing system of claim 8 wherein determining, based on a comparison of the next-to-complete ITAG and the first ITAG, that the tail EAT row has completed comprises:

determining that the next-to-complete ITAG is greater than or equal to the first ITAG.

10. The computing system of claim 9 wherein the first ITAG is a first in a range of ITAGs associated with the tail-plus-one EAT row, and wherein the range of ITAGs associated with the tail-plus-one EAT row does not comprise the next-to-complete ITAG.

11. The computing system of claim 8, the multi-slice computer processor further configured for:

advancing a tail pointer to point to the tail-plus-one EAT row.

12. The computing system of claim 11, the multi-slice computer processor further configured for:

receiving an additional next-to-complete ITAG;

determining that the tail-plus-two EAT row comprises a first ITAG that is greater than the additional next-to-complete ITAG; and delaying retirement of the tail-plus-one EAT row.

13. The computing system of claim 8 wherein retiring the tail EAT row comprises:

updating a come from address register.

* * * * *